US000001500H

United States Statutory Invention Registration [19]

[11] Reg. Number: H1500

Kronenberg

[45] Published: Nov. 7, 1995

[54] ULTRA-SENSITIVE CARBON FIBER DOSIMETER

[75] Inventor: Stanley Kronenberg, Skillman, N.J.

[73] Assignee: The United States of America as represented by the Secretary of the Army, Washington, D.C.

[21] Appl. No.: 167,258

[22] Filed: Dec. 15, 1993

Related U.S. Application Data

[63] Continuation-in-part of Ser. No. 21,427, Feb. 23, 1993, abandoned.

[51] Int. Cl.[6] ..... G01T 1/14; H01J 47/04

[52] U.S. Cl. ..... 250/376

[58] Field of Search ..... 250/376

[56] References Cited

U.S. PATENT DOCUMENTS

| | | | |
|---|---|---|---|
| 2,648,777 | 8/1953 | Landsverk | 250/376 |
| 2,793,298 | 5/1957 | Landsverk | 250/376 |
| 4,306,154 | 12/1981 | Williams, Jr. et al. | 250/376 |

OTHER PUBLICATIONS

H. H. Rossi, "Status of Neutron Dosimetry", *Nucleonics*, vol. 10, No. 9, (Sep. 1952) pp. 26–27.

*Primary Examiner*—Bernarr E. Gregory

*Attorney, Agent, or Firm*—Michael Zelenka; James A. DiGiorgio

[57] ABSTRACT

A 20 mR ($5.16 * 10^{-3}$ C/Kg) full-scale carbon fiber dosimeter that provides a direct reading of low-level Gamma and neutron exposure in real-time. To attain this, the dosimeter utilizes an enlarged ionization chamber that has a cylindrical shape with an inside diameter at least 1 inch (2.54 cm), an outside diameter at least 1.1 inches (2.794 cm), an inside height at least 0.725 inch (1.8415 cm), and an outside at least 1 inch (2.54 cm). Moreover, the inner wall of the dosimeter's ionization chamber is lined with either a predetermined hydrogenous or non-hydrogenous material having different sensitivity to gamma ray and neutron exposure.

3 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ULTRA-SENSITIVE CARBON FIBER DOSIMETER

GOVERNMENT INTEREST

The invention described herein may be manufactured, used and licensed by or for the Government for governmental purposes without the payment to me of any royalty thereon.

NOTICE OF CONTINUATION

This application is a continuation-in-part of application Ser. No. 08/021,427, entitled 20 mR FULL SCALE CARBON FIBER DOSIMETER, by S. Kronenberg, Attorney Docket No. CECOM 4878, filed Feb. 23, 1993.

BACKGROUND OF THE INVENTION

The present invention relates to nuclear radiation measuring devices of the type used to measure the amount of radiation exposure delivered over a period of time. More specifically, it relates to an improved direct-reading dosimeter for providing both a combined and a separate measurement of low-level gamma and neutron exposure.

As nuclear technology has become more widespread in our society, so has the desire for radiation measuring devices that can detect even the slightest levels of exposure that an individual has received over any given time. Moreover, those handling radioactive materials for testing and developing nuclear technology and those exposed to nuclear weaponry, nuclear power plants, and workers in the field of nuclear medicine, have long recognized the need for a dosimeter that can measure radiation doses at levels as low as the known average daily background level.

Currently, there are few devices that can conveniently and inexpensively provide such low-level measurements. One device, a Photo-Multiplier/Scintillator System utilizes the immediate conversion of ionizing radiation energy into visible light energy to measure radiation exposure. Another device, a thermoluminescent dosimeter, utilizes thermoluminescent materials (e.g. LiF) to detect exposure levels. In such a device, radiation raises the electrons in the thermoluminescent material to an excited energy level. These electrons remain excited until the material is exposed to high temperature. Consequently, radiation exposure levels can be determined by heating the exposed crystals and measuring the amount of light emitted as the excited electrons drop back to their ground state. To those who desire quick measurements, in real time, while they operate in an environment suspect of radiation, both the Scintillator System and the thermoluminescent dosimeter are inadequate (inconvenient and time consuming).

A more preferred method of measuring exposure in real time is a direct-reading dosimeter or exposure meter. One such device, a 200 mR ($5.16 * 10^{-2}$ C/Kg) Carbon Fiber Dosimeter, is disclosed in U.S. Pat. No. 4,306,154, issued Dec. 15, 1981 by Williams et al and incorporated herein by reference. This device utilizes an ionization chamber, an electrically charged fiber electrometer, and a viewing means to measure exposure. Radiation passing through the ionization chamber discharges the electrometer, thereby moving the charged electrometer fiber in proportion to the amount of radiation passing through the chamber. Thus, an individual wearing the dosimeter can determine his own exposure by simply looking through the viewing means at the electrometer fiber deflection at any time.

Although this device is quick and convenient for measuring personal exposure, it does not provide the sensitivity needed to accurately measure the low levels that may be encountered in a suspect environment (e.g. nuclear contaminations area). This is fully evident in that the above device provides full scale readings of 200 mR ($5.16 * 10^{-2}$ C/Kg), wherein a background exposure dose rate is typically in the range of 0.014 mR/hr ($3.612 * 10^{-6}$ C/Kg/hr). As such, those concerned with measuring exposure levels in such environments suspect of radiation, have long recognized a need for a dosimeter that provides the convenience of the 200 mR ($5.16 * 10^{-2}$ C/Kg) Full Scale Carbon Fiber Dosimeter but with greater sensitivity to lower exposure levels.

A similar device was disclosed in U.S. Pat. No. 2,648,777, entitled "Quartz Fiber Dosimeter," issued to O.G. Landsverk on Aug. 11, 1953, and incorporated herein by reference. The Landsverk device utilizes a quartz fiber, mounted in an air chamber, that functions to indicate the real time dosage level. The chamber wall is lined with hydrogenous material having an average atomic number of 7.2 (which is the average atomic number of air), and thus provides readings in roentgens. The hydrogenous chamber wall also makes the Landsverk dosimeter sensitive to fast neutrons, and thus gives a composite reading of the gamma ray exposure and the neutron exposure. This is not desirable when separate real-time readings of the gamma dosage and the neutron dosage are required.

Although it has been known for quite some time that certain materials have different levels of sensitivity to gamma and neutron exposure, there is no existing device that has properly taken advantage of such technology to provide separate measurements of the gamma and neutron exposure. See "Status of Neutron Dosimetry," by H. H. Rossi, published in Nucleonics, September, 1952, and incorporated herein by reference. All existing devices provide a composite reading of the gamma and neutron dosage.

Therefore, it is proposed that a device that properly takes advantage of the different sensitivities inherent in different materials can provide both a combined and a separate gamma and neutron dose measurements in real-time. Moreover, a device that can provide even greater sensitivity to such gamma and neutron exposure levels is greatly desired by those skilled in the art. The present invention fulfills these needs.

SUMMARY OF THE INVENTION

The general purpose of the invention is to provide a direct-reading carbon fiber dosimeter that can accurately measure low-level gamma ray and neutron exposure in real-time. To attain this, the present invention contemplates increasing the chamber size of a carbon fiber dosimeter such that its sensitivity is 20 mR ($5.16 * 10^{-3}$ C/Kg) full scale.

In one embodiment of the invention, the wall of the enlarged chamber is lined with a predetermined non-hydrogenous material so that only gamma and soft X-ray exposure is measured. In other words, the dosimeter measures the composite of the gamma ray and soft X-ray exposure.

In another embodiment of the invention, the wall of the enlarged chamber is lined with a predetermined hydrogenous material so that the gamma and fast neutron exposure is measured. In other words, the dosimeter measures the composite of both.

It is another object of the invention to provide a means for obtaining a separate real-time measurement of the gamma ray exposure and the neutron exposure. To attain this, the present invention contemplates utilizing both the hydrogenous and non-hydrogenous measurements, simultaneously, so that the amount of exposure due only to neutron radiation can be determined.

According to yet another aspect of the invention, the sensitivity of the dosimeter is increased even further by rearranging the optics of the viewing means (built-in microscope). More specifically, the fiber and its deflection are magnified by reducing the distance between the carbon fiber and the objective lens while increasing the distance between the objective and ocular lens.

According to yet another aspect of the invention, the sensitivity is increased by combining the effect of increasing the ion chamber volume with the effect of rearranging the optics of the viewing means as described above. This combination can achieve an even greater sensitivity (5 mR ($1.29 * 10^{-2}$ C/Kg) full scale).

DESCRIPTION OF THE PREFERRED EMBODIMENT

Figure 1:
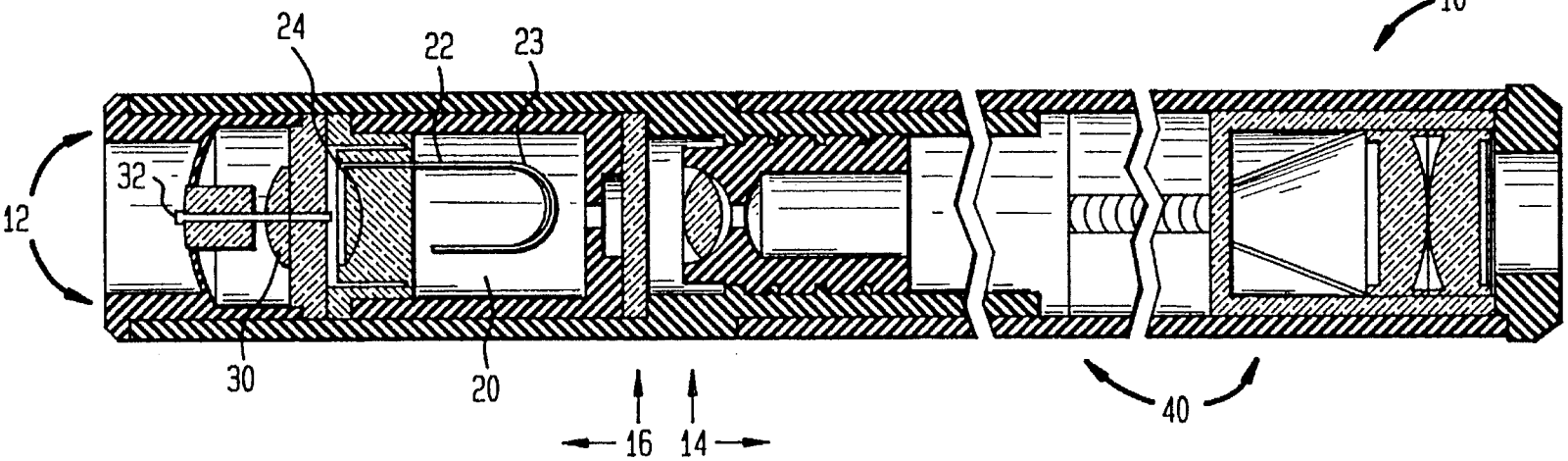
FIG. 1 (PRIOR ART)
FIG. 1 is a longitudinal cross-sectional view of the prior art.

Referring to FIG. 1, there is shown prior art carbon fiber dosimeter 10 upon which the present invention has improved. Prior art dosimeter 10 comprises a tubular shaped casing or barrel 12 having upper and lower sections 14 and 16, respectively. Dosimeter 10 is of a size and shape that can easily be carried in a shirt pocket. Lower section 16 of barrel 12 contains a cylindrical ionization chamber 20 which comprises an electrometer 22 having a frame 24. A charging means 30 having a charging pin 32 connects to electrometer 22 so that the chamber and electrometer can be fully charged prior to taking any readings. Thus, when radiation passes through chamber 20, chamber 20 and electrometer 22 are discharged in proportion to the amount radiation that passes through. As chamber 20 and electrometer 22 discharge, carbon fiber 23 moves in proportion to the discharge indicating the exposure level. This level can be viewed through optical means 40 located in upper section 14 of barrel 10. Due to the size and shape of ionization chamber 20, however, deflection of carbon fiber 23 is limited to 200 mR ($5.16 * 10^{-2}$ C/Kg) full scale sensitivity.

Figure 2:
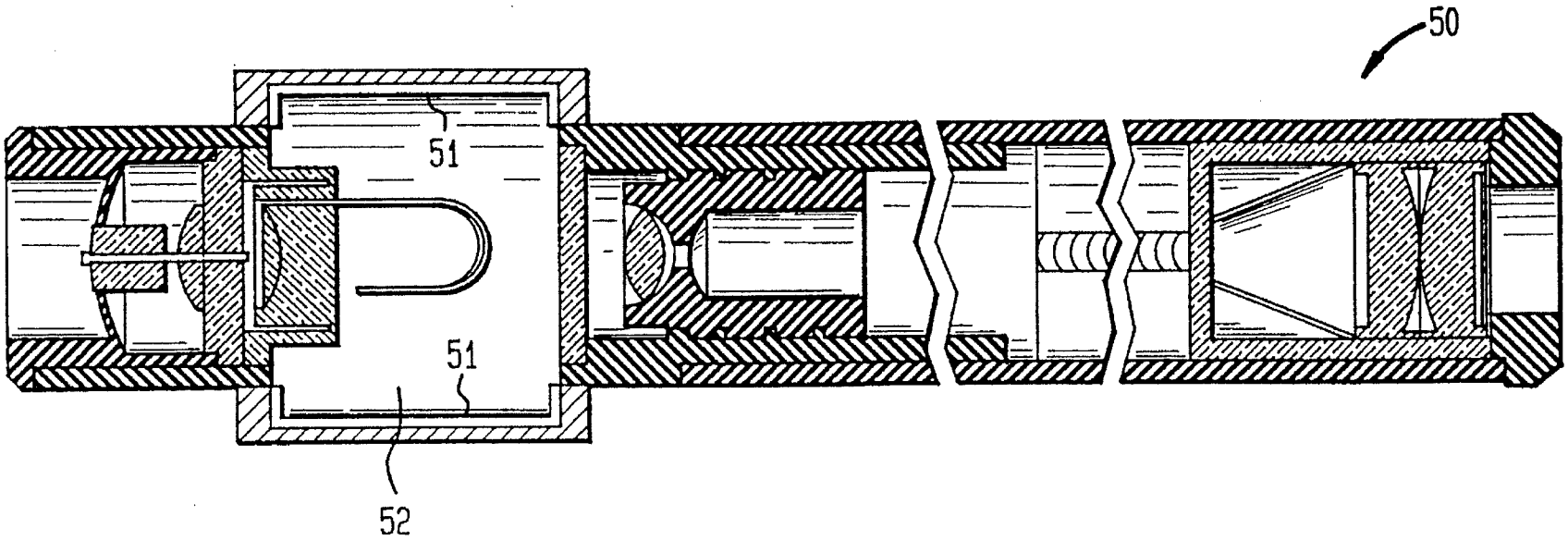
FIG. 2 is a longitudinal cross-sectional view of a preferred embodiment of the invention showing the enlarged ion chamber that displaces the barrel, wherein the chamber wall is lined with hydrogenous material.

Referring to FIG. 2, there is shown an improved dosimeter 50, in accordance with the present invention. In addition to the elements of dosimeter 10, dosimeter 50 has a cylindrical ionization chamber 52 with a volume larger than that of chamber 20. More specifically, chamber 52 has an inside diameter of 1 inch (2.54 cm), an outside diameter of 1.1 inches (2.794 cm) and a height of 0.725 inch (1.8415 cm) inside and 1 inch (2.54 cm) outside. This increase in volume greatly enhances the measuring sensitivity of dosimeter 50 from 200 mR ($5.16 * 10^{2}$ C/Kg) to 20mR ($5.16 * 10^{-3}$ C/Kg) full scale.

Figure 3:
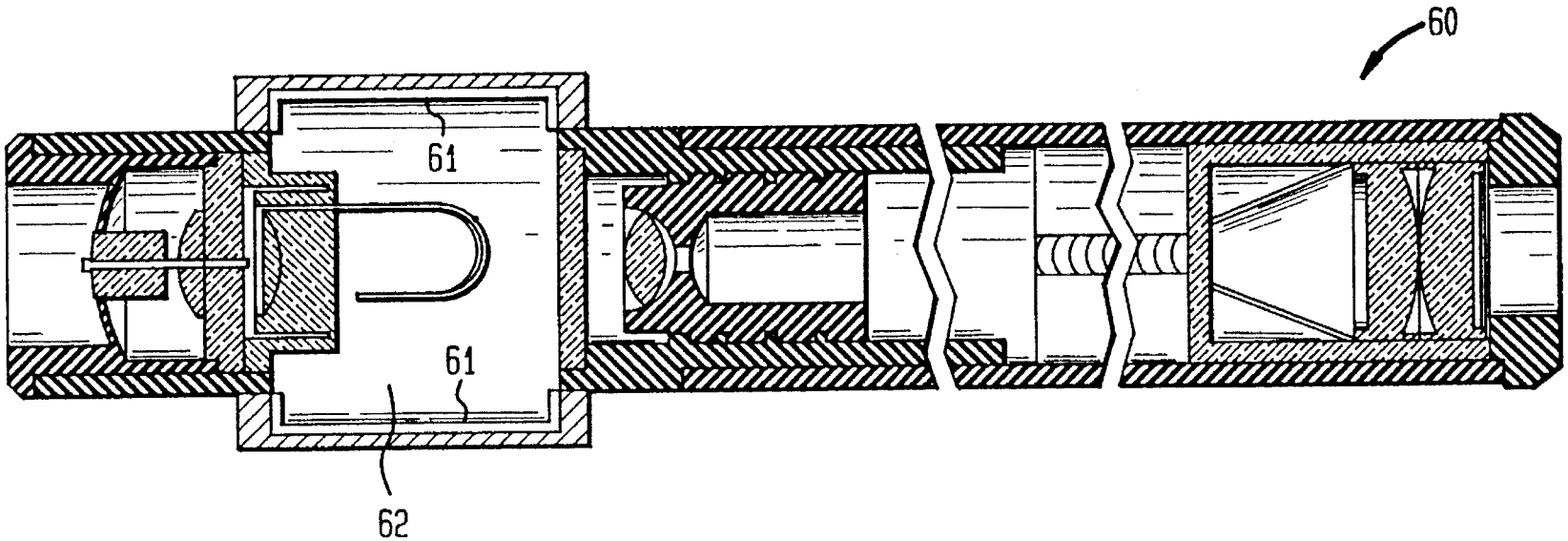
FIG. 3 is a longitudinal cross-sectional view of another embodiment of the invention showing the enlarged ion chamber that displaces the barrel, wherein the chamber wall is lined with a predetermined non-hydrogenous material.

Referring to FIG. 3, there is shown device 60 which is similar to device 50, in FIG. 2, except that the inside wall of each chamber 60 and 50 are lined with different material. The inside wall of chamber 60 is lined with a predetermined non-hydrogenous material (hydrogen-free TEFLON®) 61 that is only sensitive to gamma rays, whereas the inside wall of chamber 50 is lined with a predetermined hydrogenous material (polyethylene) 51 that is sensitive to both gamma rays and neutrons. As a result, separate measurements of the gamma dose and the neutron dose can be derived from the simultaneous measurement of the real-time dosage with dosimeter 50 and 60.

More specifically, the readings from dosimeter 50 and 60 provide two equations (R1 and R2) with two unknowns (Dgamma and Dneutron), as shown below:

$$R1=D\text{gamma}*S1\text{gamma}+D\text{neutron}*S1\text{neutron}$$

$$R2=D\text{gamma}*S2\text{gamma}+D\text{neutron}*S2\text{neutron}$$

"Dgamma" is the actual gamma-ray dosage and "Dneutron" is the dosage due to neutron radiation to which dosimeters 50 and 60 are exposed. "R1" is the reading from dosimeter 50 which has hydrogenous chamber wall 51, and "R2" is the reading from dosimeter 60 which has non-hydrogenous chamber wall 61. "S1gamma" and "S1neutron" refer to dosimeter 50's sensitivity to the gamma and neutron exposure, respectively. "S2gamma" and "S2neutron" refer to dosimeter 60's sensitivity of the gamma and neutron dosage, simultaneously.

Since dosimeter 50 utilizes a polyethylene lining 51 and dosimeter 60 utilizes a hydrogen-free TEFLON® lining 61, each dosimeter has the same sensitivity to gamma rays. Consequently, S1gamma equals S2gamma. Moreover, since dosimeter 60 has virtually no sensitivity to neutrons, S2neutron is negligible. As a result, the simultaneous equations can be simplified to the following:

$$D\text{neutron}=(R1-R2)/S1\text{neutron}$$

$$D\text{gamma}=R2/S2\text{gamma}$$

Consequently, from the simultaneous measurement of radiation exposure with dosimeters 50 and 60, the actual neutron dosage (Dneutron) and the actual gamma-ray dosage (Dgamma) can be determined since the sensitivity of each dosimeter to neutrons and gamma-rays are known (from the predetermined material lining their respective chamber walls.

What is claimed is:

1. A highly sensitive carbon fiber dosimeter that provides real-time measurements of radiation exposure including gamma rays and neutrons, comprising:

a tubular plastic barrel having an ionization chamber that provides the dosimeter with 20 mR full scale sensitivity to the radiation exposure, said ionization chamber having a cylindrical shape with an inside diameter of at least 1 inch (2.54 cm), an outside diameter of at least 1.1 inches (2.794 cm), an inside height of at least 0.725 inch (1.8415 cm);

said ionization chamber having an inner wall composed of a predetermined material having a predetermined sensitivity to the gamma rays and the neutrons.

2. The dosimeter of claim 1 wherein said predetermined material composing said inner wall of said ionization chamber is an hydrogenous material having a predetermined sensitivity to both the gamma ray and neutron components of the radiation exposure.

3. The dosimeter of claim 1 wherein said predetermined material composing said inner wall of said ionization chamber is a non-hydrogenous material having a predetermined sensitivity only to the gamma ray component of the radiation exposure.

* * * * *